July 15, 1952
T. J. PETHES
2,603,730
INSTRUMENT-TYPE RELAY
Filed May 6, 1949
2 SHEETS—SHEET 1
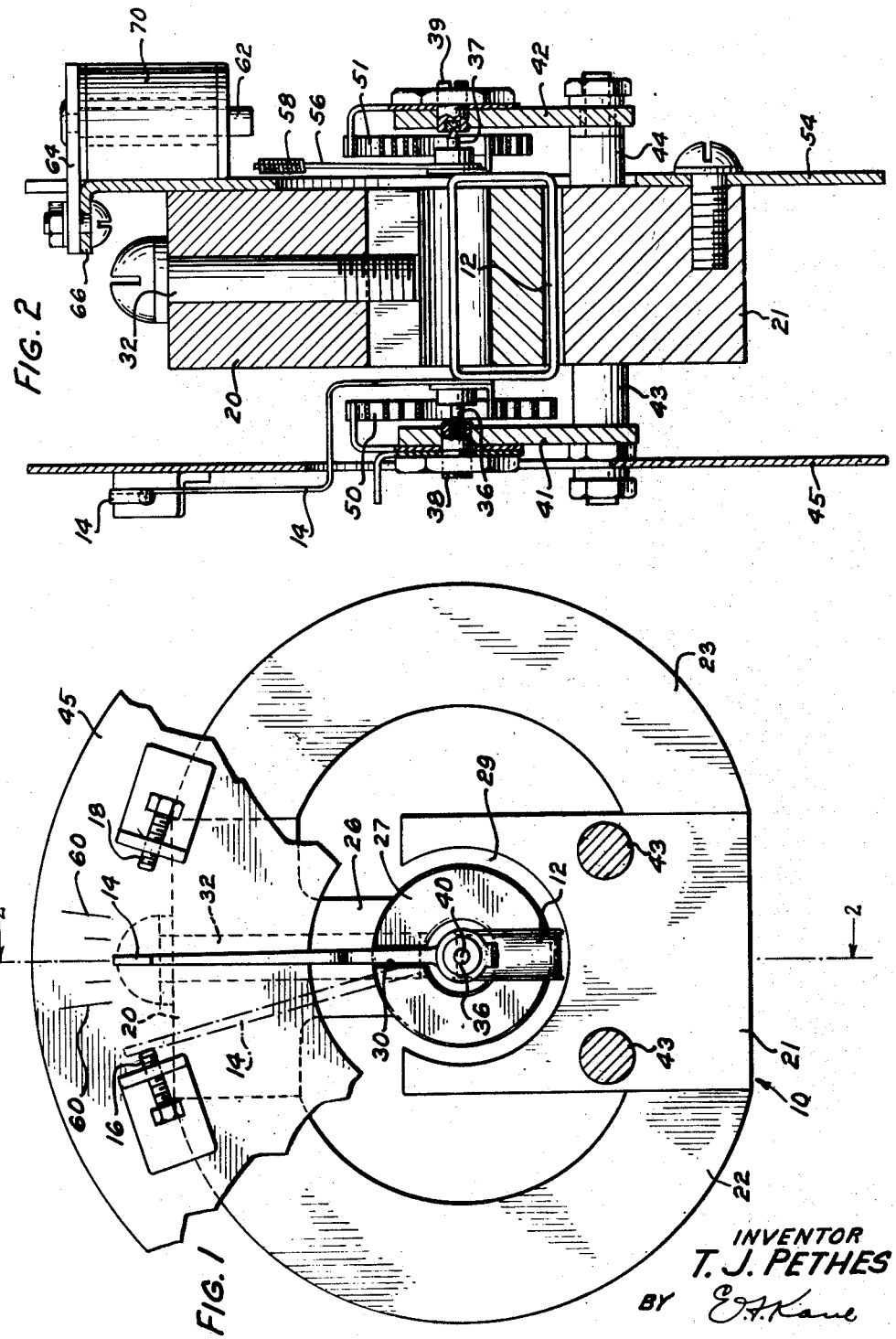
INVENTOR
T. J. PETHES
BY
ATTORNEY

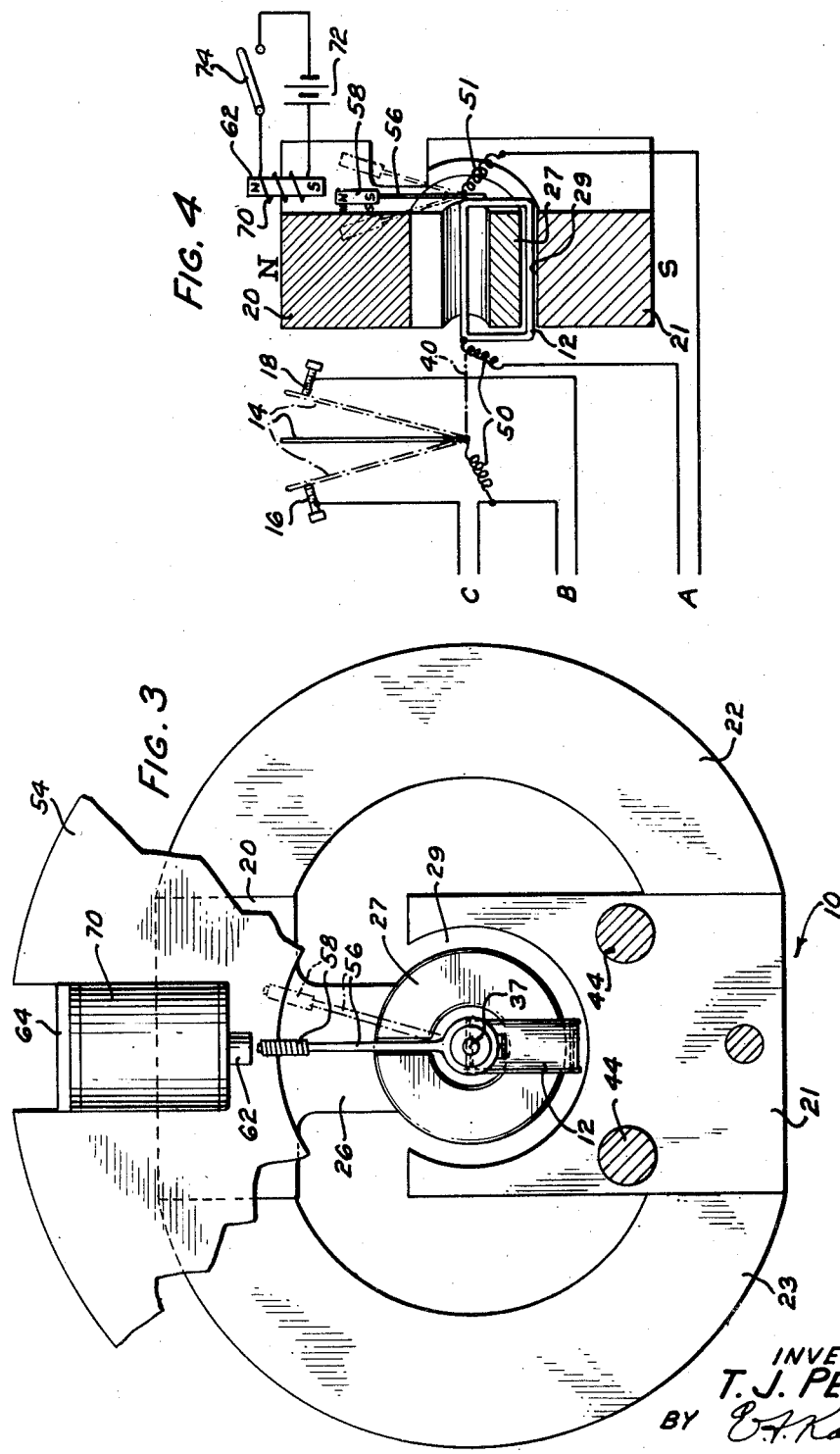

Patented July 15, 1952

2,603,730

UNITED STATES PATENT OFFICE 2,603,730

INSTRUMENT-TYPE RELAY

Theodore J. Pethes, Elmwood Park, Ill., assignor to Western Electric Company, Incorporated, New York, N. Y., a corporation of New York Application May 6, 1949, Serial No. 91,730

8 Claims. (Cl. 200—110)

This invention relates to electrical control devices and more particularly to an instrument-type relay.

It is an object of the present invention to provide an improved relay type of electrical control device.

In one embodiment of the invention, there is provided a permanent magnet structure and a movable system including a coil eccentrically mounted for oscillating movement in the field of the magnet and having a contact arm movable therewith into engagement with a pair of contacts mounted on opposite sides of the contact arm and in the path of movement thereof. A soft iron counter-weight, mounted for oscillatable movement with the coil and in the field of the magnet adjacent the rear face thereof for balancing the moving system, becomes a magnet by induction and has a normal inoperative position disposed in the neutral position in the magnetic field, where the lateral components of the magnetic lines of force tending to rock the movable magnet in opposite directions about its axis of rotation are balanced, resulting in a state of equilibrium. The inductively charged magnet, in response to a predetermined minimum force initially displacing the movable magnet from its normal inoperative or neutral position, is stressed away from said normal inoperative position to an operative position by the mutually repelling magnetic forces of the like poles of the permanent magnet and the movable inductively charged magnet and serves to urge the contact arm into engagement with the contacts individually with sufficient pressure to insure a good electrical connection therebetween. A soft iron core member stationarily mounted in the field of the permanent magnet in close proximity to the movable magnet when it is in its neutral position, becomes a magnet through induction and the adjacent ends of the induced movable and stationary magnets, being of opposite polarity, magnetically attract each other and serve to yieldably maintain the movable magnet in its normal inoperative position. A coil, wound on the core member or stationary magnet and connected through a control switch to a source of current, when energized, serves, in cooperation with the core, as an electro-magnet having sufficient magnetic force to attract the movable magnet from its operative position and restore it to its normal inoperative or neutral position.

Other objects and advantages will be apparent from the following detailed description of the invention and the accompanying drawings illustrating the preferred embodiment thereof in which Fig. 1 is a front elevational view of the device with portions thereof broken away;

Fig. 2 is a vertical sectional view through the device taken on the line 2—2 of Fig. 1;

Fig. 3 is a rear elevational view of the device with portions thereof broken away; and Fig. 4 is a diagrammatic view of the device.

Generally, the device comprises a composite permanent magnet structure 10 in the field of which is pivotally mounted a moving system including a rectangular coil 12 having a contact arm 14 secured thereto for movement therewith to make contact with either one of a pair of contacts 16 and 18 mounted on opposite sides of the contact arm 14 in the path of movement thereof.

The magnet structure 10 comprises soft iron pole pieces 20 and 21 maintained in spaced relation to each other by a pair of curved permanent magnets 22—23 secured to the pole pieces. The pole piece 20, the north pole, has a reduced portion 26, to which is secured a cylindrical pole piece 27 forming an extension of the pole piece 20 and fitting into a cylindrical recess in the inwardly projecting end of the pole piece 21 to form an annular field space 29 between the poles. The cylindrical pole extension 27 is slotted at 30 to permit the assembly thereon of the rectangular coil 12 and is secured to the pole piece 20 by the cap screw 32 (Figs. 1 and 2).

Conical pivots 36—37, attached to opposite ends of the rectangular coil 12, are supported in pivot bearings 38—39 for mounting the moving system for oscillation about the axis 40 of the cylindrical pole piece extension 27. The pivot bearings 38—39 are supported in plates or brackets 41—42, secured to studs 43—44, fixed to and extending from opposite sides of the pole piece 21. An annular plate or dial 45 is supported on the studs 43 extending from the forward side of the permanent magnet and supports the contact members 16 and 18 thereon.

A pair of flexible spiral biasing springs 50 and 51, mounted on the pivot pins 36 and 37, respectively, have their outer ends connected to adjustable elements in a conventional manner for returning the coil 12 to its normal inoperative or zero position, and for producing a predetermined limited restraining torque. These spiral biasing springs may vary in size according to the requirement of the device, and they serve as flexible electrical conductors connecting the coil 12 to one component of the control circuit. The spiral coil 50 is also connected to the contact arm 14 and serves as a flexible electrical connection to another component of the circuit, as indicated diagrammatically in Fig. 4. An annular plate or mounting disk 54 is secured to the rear face of the magnet structure 10 and serves as a means by which the device may be mounted in a suitable casing or housing.

In order to balance the moving system and the eccentric mounting of the coil 12, a counterbalance mechanism is provided which comprises, in addition to the contact arm 14, a supporting arm 56 and a counterweight 58 supported on the end thereof. The supporting arm 56 of non-magnetic material is suitably secured to the rear end of the coil 12 and extends vertically therefrom parallel to the rear face of the pole piece 20. The counterweight 58 of magnetic material, preferably soft iron in the form of a helical wire or tube, is secured to the end portion of the arm 56 and is positioned thereby in relatively close proximity to the rear face of the pole piece 20. Mounted in the field of the magnet pole pieces 20 and 21, the member 58 is, in effect, a magnet by virtue of the magnetism induced therein and has a north upper pole and a south lower pole, as shown diagrammatically in Fig. 4. Corresponding oppositely disposed portions of the movable magnet 58 and the adjacent section of the pole piece 20 (Fig. 4) have similar polarities, as, for example, the north pole of the movable magnet 58 is adjacent a portion of the permanent magnet of the same polarity and the south pole of the movable magnet is adjacent the portion of the permanent magnet of the same polarity. The induced magnetism in the movable magnet 58 is of the same polarity as the adjacent portions of the pole piece 20. The similar polarities of the movable magnet 58 and the adjacent section of the pole piece 20 of the permanent magnet have mutually repelling magnetic forces which tend to move the movable magnet laterally in opposite directions on opposite sides of a neutral or zero position on the central plane through the pole pieces. When the contact arm 14 is in its normal zero position, the movable magnet 58 is vertically disposed and aligned along a central plane or a neutral axis of the magnetic field where the lateral components thereof tending to rotate the movable magnet in opposite directions about the axis of rotation are balanced or in a state of equilibrium. In this normal, neutral, zero, or inoperative position of the movable magnet, the mutually repelling magnetic forces of the movable and permanent magnets are balanced, and the magnet is in a state of rest. Because of the restraining effects of the biasing springs 50 and 51, the neutral or inoperative position of the movable magnet 58 has some latitude and permits a limited movement of the movable magnet 58 as between the lines 60 on a scale inscribed on the dial 45, as indicated in Fig. 1.

In response to a predetermined minimum force initially displacing the movable magnet to one side or the other to unbalance this balanced condition of the magnet 58 relative to the permanent magnet 10, the movable magnet is urged away from its neutral position by the mutually repelling magnetic forces of opposite polarity of the movable magnet 58 and the pole piece 20. Thus, in response to a flow of current of predetermined minimum intensity in the circuit component A and the coil 12, the movable magnet 58 is moved to a position substantially in alignment with the line 60 where it is beyond the restraining force of the neutral position and is subjected to the influence of the mutually repelling magnetic force of the movable magnet 58 and the pole piece 20, which force operates to oscillate the movable magnet 58, the movable system, and the contact arm 14 to its closed or operative position with a pressure great enough to insure a good electrical connection between the contact arm 14 and the individual contacts 16 or 18. It will thus be seen that, in response to the movement of the movable magnet 58 to the lines 60, and as a result of the magnetic repulsion between the movable magnet and the pole piece 20, the contact arm is moved into engagement with one of the contacts 16 or 18 and is maintained in engagement therewith with a force sufficient to establish a relatively low resistance contact.

Means in addition to the biasing spring 50 and 51 are provided to yieldably restrain the movable magnet from movement from its neutral position. In the present embodiment of the invention, an elongated core member 62 of soft iron is mounted in fixed position in the magnetic field and in central alignment with the pole piece 20. The core member 62, which is located above and adjacent to the movable magnet 58 when it is in its normal position, is suspended from a plate 64 which, in turn, is secured to an ear 66 on the mounting plate 54. Because of the magnetism induced in the core member 62, it is, in effect, a stationary magnet with a south pole adjacent the north pole of the movable magnet 58. Because of the attractive magnetic force of the adjacent opposite poles of the stationary and movable induced magnets 62 and 58, respectively, the stationary magnet 62 serves to yieldably maintain the movable magnet in its normal inoperative position. However, the magnetic attraction between the movable magnet 58 and the stationary magnet 62 is limited to a degree which will not prevent the rotation of the coil 12 and the moving system in response to a predetermined relatively small current passing through the circuit component A and the coil 12.

A coil 70 wound on the core member 62 is electrically connected to a source of current 72 through a controlling switch 74. Upon the closing of the switch 74, the coil 70 is energized and, in cooperation with the core member 62, forms an electromagnet having a polarity similar to the induced magnet 62 and producing a magnetic field sufficient to attract the movable magnet 58 and restore it from its operative position to its normal inoperative position.

To review the operation of the control device, it will be apparent that, with the contact arm 14 and the movable magnet 58 in their normal inoperative or neutral position, and in response to a flow of current in one direction of a predetermined minimum strength in the circuit component A and the coil 12, sufficient torque will be developed to overcome the restraining forces of the springs 50 and 51 and the stationary magnet 62 and cause the coil 12 and the moving system to rotate about the axis 40 and impart an initial displacement of the movable magnet 58 relative to the pole piece 20. This initial displacement of the movable magnet 58 moves it out of its neutral position and causes an unbalancing of the magnetic forces between the movable magnet 58 and the pole piece 20 and the mutually repelling magnetic forces of the movable magnet 58 and the pole piece 20 of the permanent magnet will cause the movable magnet 58 to rotate about the axis 40 away from its normal inoperative position, and this imparts an arcuate movement to the moving system, which movement is arrested by the engagement of the contact arm 14 with one of the contacts 16 or 18.

The mutually repelling magnetic force between the movable magnet 58 and the permanent magnet 20 applies a substantial torque to the moving system and effects a relatively high pressure contact between the contact arm 14 and the contact members 16 or 18 to establish a good electrical connection therebetween. This mutually repelling magnetic force also serves to maintain the contact arm 14 and the movable magnet 58 in their closed or operative positions until they are restored to their normal inoperative position by the closing of the switch 74. Upon the closing of the switch 74, the coil 70 becomes energized and the attractive influence of the magnetic field created thereby encompasses the movable magnet 58 and is of sufficient strength to restore the magnet 58 from its operative position to its normal inoperative position against the opposing force of the mutually repelling magnetic fields of the movable and permanent magnets. After the movable magnet 58 and the contact arm 14 are restored to their normal inoperative positions, the switch 74 may be opened, leaving the control mechanism in its normal inoperative position shown in the drawings. It will be understood that in response to a flow of current of predetermined minimum intensity in the opposite direction in the circuit component A and the coil 12, the coil 12 in the moving system will rotate about the axis 40 in the opposite direction and initiate a sequence of operation as explained above but in the reverse direction.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A control device comprising a permanent magnet having a magnetic field with a neutral plane extending through the poles of the magnet, a movable coil, means mounting said coil between said poles for oscillation about an axis in said neutral plane, a contact arm mounted on said movable coil for movement therewith, a contact mounted in the path of movement of said contact arm, a magnetizable member, means mounting said magnetizable member for oscillatable movement with said coil and in the field of said permanent magnet, said magnetizable member forming an induced magnet and having a normally stationary inoperative position on the neutral plane of said permanent magnet and adapted to be urged away from said inoperative position by the mutually repelling force of similar magnetic polarities of the permanent and induced magnets in response to an initial displacement of said magnetizable member from said inoperative position, whereby said contact arm is urged into engagement with said contact, and magnetic means for yieldably retaining said magnetizable member in said inoperative position.

2. A control device comprising a permanent magnet having a magnetic field with a neutral plane extending through the poles of the magnet, a movable coil, means mounting said coil between said poles for oscillation about an axis in said neutral plane, a contact arm mounted on said movable coil for movement therewith, a contact mounted in the path of movement of said contact arm, a magnetizable member, means mounting said magnetizable member for oscillatable movement with said coil and in the field of said permanent magnet, said magnetizable member forming an induced magnet and having a normally stationary inoperative position on the neutral plane of said permanent magnet and adapted to be urged away from said inoperative position by the mutually repelling force of similar magnetic polarities of the permanent and induced magnets in response to an initial displacement of said magnetizable member from said inoperative position, whereby said contact arm is urged into engagement with said contact, means for yieldably retaining said magnetizable member in said inoperative position, and means for restoring said magnetizable member to said inoperative position.

3. A control device comprising a permanent magnet having a magnetic field with a neutral plane extending through the poles of the magnet, a movable coil, means mounting said coil between said poles for oscillation about an axis in said neutral plane, a contact arm mounted on said movable coil for movement therewith, a contact mounted in the path of movement of said contact arm, a magnetizable member, means mounting said magnetizable member for oscillatable movement with said coil and in the field of said permanent magnet, said magnetizable member forming an induced magnet and having a normally stationary inoperative position on the neutral plane of said permanent magnet and adapted to be urged away from said inoperative position by the mutually repelling force of similar magnetic polarities of the permanent and induced magnets in response to an initial displacement of said magnetizable member from said inoperative position, whereby said contact arm is urged into engagement with said contact, means for yieldably retaining said magnetizable member in said inoperative position, and magnetic means for restoring said magnetizable member to said inoperative position.

4. A control device comprising a permanent magnet having a magnetic field with a neutral plane extending through the poles of the magnet, a movable coil pivotally mounted in the field of said permanent magnet for oscillatable movement about an axis in said neutral plane, a contact arm mounted on said movable coil for movement therewith, a contact mounted in the path of movement of said contact arms, a magnetizable member, means mounting said magnetizable member for oscillatable movement with said coil and in the field of said permanent magnet, said magnetizable member forming an induced movable magnet having a normally stationary inoperative position along the neutral plane of said permanent magnet and adapted to be stressed away from said inoperative position by the mutually repelling force of similar magnetic polarities of the permanent and movable magnets in response to an initial displacement of said movable magnet from said inoperative position to press said contact arm into engagement with said contact, a magnetizable element mounted in fixed position in the field of said permanent magnet and having one end thereof adjacent said movable magnet, said magnetizable element acting as a magnet by induction and serving, through the mutually attractive magnetic force thereof and the movable magnet, to yieldably maintain said movable magnet in its inoperative position.

5. A control device comprising a permanent magnet having a magnetic field with a neutral plane extending through the poles of the magnet, a movable coil pivotally mounted in the field of said permanent magnet for oscillatable movement about an axis in said neutral plane, a contact arm mounted on said movable coil for movement therewith, a contact mounted in the path of movement of said contact arm, a magnetizable member, means mounting said magnetizable member for oscillatable movement with said coil and in the field of said permanent magnet, said magnetizable member forming an induced movable magnet having a normally stationary inoperative position along the neutral plane of said permanent magnet and adapted to be stressed away from said inoperative position by the mutually repelling force of similar magnetic polarities of the permanent and movable magnets in response to an initial displacement of said movable magnet from said inoperative position to press said contact arm into engagement with said contact, a magnetizable element mounted in fixed position in the field of said permanent magnet and having one end thereof adjacent said movable magnet, said magnetizable element acting as a magnet by induction and serving, through the mutually attractive magnetic force thereof and the movable magnet, to yieldably maintain said movable magnet in its inoperative position, and a coil for said magnetizable element connectible to a source of electrical current to energize said coil and further magnetize said element and thereby effect the return of said magnetizable member to its inoperative position.

6. In a relay type control device, the combination of a permanent magnet, having a neutral plane passing through the poles of said magnet, a balanced coil mounted for oscillatable movement about an axis in the field of said permanent magnet and in said neutral plane, a contact arm on said coil for movement therewith, a pair of contacts arranged on opposite sides of said contact arm and in the path of movement thereof, a movable magnet, and means mounting said movable magnet on said coil in spaced relation to said contact arm and to said axis and in the field of and in close proximity to said permanent magnet for oscillatable movement with said coil, said movable magnet being arranged relative to said permanent magnet with like polarities of each adjacent each other and having a normal inoperative position along said neutral plane whereby the mutually repelling magnetic forces of like polarity of the movable and permanent magnets act to stress said movable magnet for movement about said axis in opposite directions and away from said neutral plane in response to an initial displacement of said movable magnet from said inoperative position.

7. A relay type control device comprising a permanent magnet having a neutral plane passing through the poles of said magnet, a balanced coil mounted for oscillatable movement about an axis in the field of said permanent magnet and in said neutral plane, a contact arm on said coil for movement therewith, a pair of contacts arranged in the path of movement of said contact arm and on opposite sides thereof, a movable magnet, means mounting said movable magnet on said coil in spaced relation to said axis and in the field of said permanent magnet for oscillatable movement with said coil, said moving magnet being arranged relative to said permanent magnet with like polarities of each adjacent each other and having a normal inoperative position along said neutral plane whereby the mutually repelling magnetic forces of the like polarities of the movable and permanent magnets act to stress said movable magnet for movement about said axis in opposite directions and away from an inoperative or neutral position where the opposing magnetic forces tending to rotate said movable magnet in opposite directions are balanced, and magnetic means for yieldably retaining said movable magnet in said neutral position.

8. A relay type control device comprising a permanent magnet having a neutral plane passing through the poles of said magnet, a balanced coil mounted for oscillatable movement about an axis in the field of said permanent magnet and in said neutral plane, a contact arm on said coil for movement therewith, a pair of contacts arranged in the path of movement of said contact arm and on opposite sides thereof, a movable magnet, means mounting said movable magnet on said coil in spaced relation to said axis and in the field of said permanent magnet for oscillatable movement with said coil, said moving magnet being arranged relative to said permanent magnet with like polarities of each adjacent each other and having a normal inoperative position along said neutral plane whereby the mutually repelling magnetic forces of the like polarities of the movable and permanent magnets act to stress said movable magnet for movement about said axis in opposite directions and away from an inoperative or neutral position where the opposing magnetic forces tending to rotate said movable magnet in opposite directions are balanced, magnetic means for yieldably retaining said movable magnet in said neutral position, and electromagnetic means for restoring said movable magnet to said neutral position.

THEODORE J. PETHES.

REFERENCES CITED

The following references are of record in the file of this patent:

UNITED STATES PATENTS

| Number | Name | Date |
|---|---|---|
| 2,262,504 | Lamb | Nov. 11, 1941 |
| 2,341,412 | Paulson | Feb. 8, 1944 |
| 2,456,171 | Bernreuter | Dec. 14, 1948 |